United States Patent [19]

Levinson

[11] Patent Number: 4,923,704
[45] Date of Patent: May 8, 1990

[54] METHODS FOR MICROWAVE COOKING IN A STEAM-CHAMBER KIT

[76] Inventor: Melvin L. Levinson, 612 Ziegler Ave., Linden, N.J. 07036

[21] Appl. No.: 106,240

[22] Filed: Oct. 7, 1987

Related U.S. Application Data

[62] Division of Ser. No. 737,502, May 24, 1985, abandoned.

[51] Int. Cl.$^5$ .............................................. A23L 1/07
[52] U.S. Cl. ............................ 426/243; 219/10.55 E; 426/107; 426/234
[58] Field of Search ............... 426/107, 113, 234, 243; 219/10.55 E; 99/DIG. 14, 451

[56] References Cited

U.S. PATENT DOCUMENTS

3,941,967  3/1976  Sumi et al. .......................... 426/243
4,306,133  12/1981  Levinson .............................. 426/243

Primary Examiner—George Yeung
Attorney, Agent, or Firm—Harry B. Keck

[57] ABSTRACT

An assembly of elements is provided for cooking food in a microwave oven. A heat generating member, a chamber forming member, a collector member and optionally a pan member are provided for assembly in various combinations and sub-combinations. The heat generating member has a metal grilling plate and a coating of microwave absorptive material on one surface and is mounted in a microwave transmissive vessel having an upper sealing rim. A microwave transmissive bowl has a rim engageable with the sealing ring to establish a chamber which will sustain superatmospheric pressures. A collector element having a microwave transmissive pot, a metal pot engaged with the microwave transmissive pot and a perforated metal plate engaged with the metal pot can be combined with the heat generating element as a food heating combination, e.g., a steak cooker. A flared sleeve can be added to provide a popcorn baker assembly. New and improved methods are disclosed for baking two-crust pies; baking pizza pies; frying foods such as eggs; baking cakes; steaming food; and other food heating, cooking, roasting, baking, frying, steaming applications.

18 Claims, 5 Drawing Sheets

METHODS FOR MICROWAVE COOKING IN A STEAM-CHAMBER KIT

This is a divisional application of co-pending application Ser. No. 737,502 filed on May 24, 1985, now abandoned.

BACKGROUND OF THE INVENTION

1. Field of the Invention

The present invention concerns a universal cooking kit for use in a microwave oven. The kit comprises a heat generating element; a chamber forming element; a collector element; and, optionally one or more pan elements. The elements may be employed in a variety of combinations. The invention further relates to methods for cooking various foodstuffs via microwave energy, e.g., baking, boiling, broiling, crusting, frying, pressure cooking, searing, steaming and toasting.

2. Description of the Prior Art

U.S. Pat. Nos. 3,701,872 and 3,777,099 describe preheating metal plates by means of a microwave-absorptive heating member for use in microwave cooking. U.S. Pat. Nos. 3,731,037 and 3,881,027 describe cooking food in a container which is in a preheated, heat insulated microwave chamber. U.S. Pat. No. 3,985,990 describes the use of a microwave shielded chamber, perforated on its food receiving surface, to permit recovery of by-products of cooking (e.g., grease) and to utilize the latent heat of vaporization which is normally dissipated in microwave cooking techniques U.S. Pat. Nos. 3,854,023 and 3,985,991 describe methods and apparatus for cooking foods in metal containers in microwave ovens U.S. Pat. No. 4,027,132 describes heating and cooking a frozen pizza pie. U.S. Pat. No. 4,306,133 describes cooking a fruit pie having a double crust in a microwave oven U.S. Pat. No. 4,280,032 describes soft cooking eggs in a microwave oven. U.S. Pat. No. 4,390,555 describes defrosting food in a microwave oven. U.S. Pat. No. 3,914,967 describes microwave heating grill constructions. U.S. Pat. No. 2,622,187 describes a microwave oven pressure cooker.

Microwave Cooking

Microwave cooking is conducted in microwave ovens which are containers having appropriate boundary walls to confine microwaves which are introduced into the chamber. In a microwave oven most foods and certain microwave absorptive materials become heated when exposed to microwave energy.

Numerous cooking utensils are available which have been specially designed for use in microwave ovens to prepare certain foods. There are steak makers, steamers, browning dishes, egg cookers, pizza pie cookers, bacon cookers, et cetera. Each of these special purpose devices employs its own unique operating sequence to cook a particular food product.

A principal object of this invention is to provide a kit of related elements for carrying out with microwave ovens practically all of the familiar cooking requirements such as baking, boiling, broiling, crusting, frying, pressure cooking, searing, steaming, toasting.

It is another object of this invention to provide methods for cooking materials such as soft cooked eggs and fried eggs; meats and vegetables; frozen foods including TV dinners, souffles, pizza pies, pies, both one-crust and two-crust; baking pies, cakes, cookies, rolls, fruit turnovers, biscuits, breads; heating and popping popcorn; cooking deep fried pre-prepared frozen fried foods such as fried chicken, fried shrimp and the like.

STATEMENT OF THE PRESENT INVENTION

According to the present invention, a universal cooking kit is provided which includes three members:
- as a first member, a heat generating element comprising a metal grill having microwave absorptive coating mounted in a microwave transmissive bowl;
- as a second member, a chamber forming element comprising a microwave transmissive bowl;
- as a third member, a collector element comprising a collection pot mounted in a microwave transmissive pot and an accompanying perforated metal cover pan; and
- as optional members, one or more pan elements each comprising a heat-conducting, flat-bottom dish with sloping sidewalls. The first and second members can be used in a combination; the first and third members can be used in a combination; the second and third members can be used in a combination. The optional member may be employed in various of the recited combinations. In some applications, the first member is a bottom member; in other applications the first member is a top member. Similarly, in some applications the second member is a bottom member and in other applications the second member is a top member. The third member is always a bottom member.

DESCRIPTION OF THE DRAWINGS

The advantages and benefits resulting from the described elements will become apparent from the following detailed description by reference to the accompanying drawings in which.

DESCRIPTION OF THE PREFERRED EMBODIMENTS

The present invention will be described in a variety of different and useful embodiments.

Figure 1:
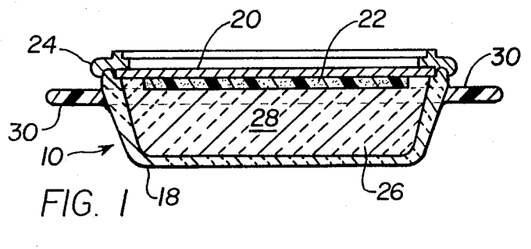
FIG. 1 is a cross-section illustration of a first member, a heat generating element.
Figure 2:
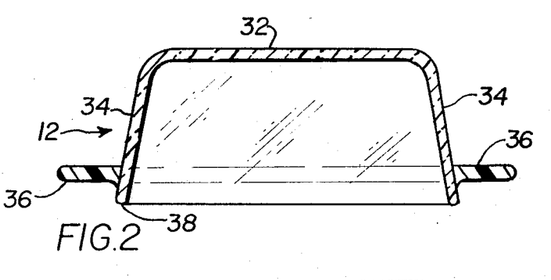
FIG. 2 is a cross-section illustration of a second member, a chamber-forming element.
Figure 3:
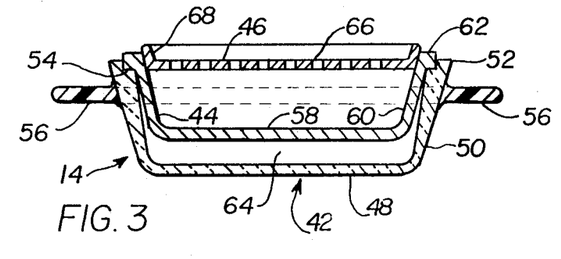
FIG. 3 is a cross-section illustration of a third member, a collector element, including, as shown, three components.
Figure 4:
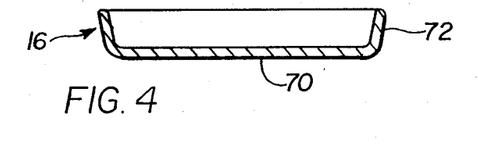
FIG. 4 is a cross-section illustration of an optional fourth member, a pan element.

A heat generating member 10 is illustrated in FIG. 1. A chamber-forming member, i.e., a microwave transmissive bowl 12 is illustrated in FIG. 2. A collector assembly 14 is illustrated in FIG. 3. An optional pan element 16 is illustrated in FIG. 4.

All of the elements 10, 12, 14, 16 are intended to be of such shape and configuration that they can be employed in various combinations as will be more fully set forth hereinafter.

The heat generating member 10 comprises a microwave transmissive vessel 18, a metal grilling plate 20, a microwave absorptive substance 22 in contact with a surface of the metal grilling plate 20, a perimeter sealing ring 24 and an interior chamber 26 preferably filled with a microwave-non-absorptive heat insulator 28 which can be a particulate thermal insulating substance such as vermiculite. The heat generating member 10 also has appropriate handle elements 30 which are fabricated from microwave-transparent, heat-insulating materials. Preferably the metal grilling plate 20 is flat but in some embodiments, the grilling plate 20 may be dished, i.e, concave, to facilitate frying eggs, infra or baking cakes, infra.

Preferably the microwave transmissive vessel 18 is fabricated from a substance such as heat resistant glass or glass ceramic or high temperature resistant plastic. The metal grilling plate 20 is preferably formed from aluminum alloys although steel, copper or other metals and metal alloys may be employed. The metal grilling plate 20 must transmit heat energy quickly and provide a rugged, reusable, cleanable cooking surface.

The microwave absorptive substance 22 preferably is a dispersion of ferrite particles in an appropriate carrier such as a silicone rubber or other temperature resistant carriers. In a preferred embodiment, a silicone rubber coating composition is filled with ferrite particles and applied as a relatively thick coating (up to about 5 millimeters) to the inner surface of the metal grilling plate 20. The size of the metal grilling plate 20 establishes the size of the other elements in the kit. Typically the metal grilling plate 20 has a diameter from 6 to 15 inches, preferably about 8 to 12 inches.

Figure 5:
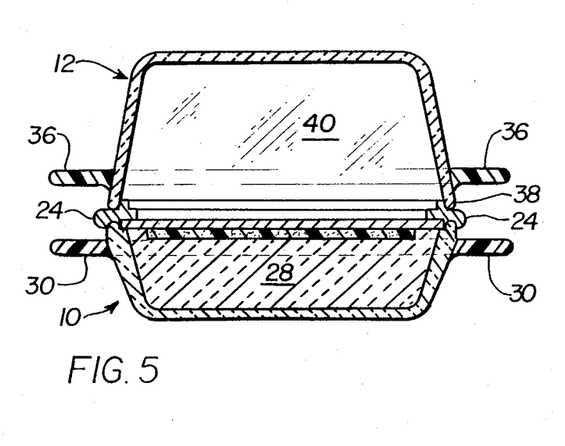
FIG. 5 is a cross-section illustration of an assembly of the first and second elements.

The microwave transmissive bowl 12 is imperforate and has an essentially flat base 32, tapering sidewalls 34, handle members 36, and a peripheral coplanar rim 38. The peripheral rim 38 preferably is adapted to engage the perimeter sealing ring 24 of the heat generating member 10 thereby, as illustrated in FIG. 5, to establish a perimeter seal for a chamber 40 which is bounded by the microwave transmissive bowl 12 and the heat generating member 10. The rim 38 of the bowl 12 may engage the metal grilling plate 20.

It is an important feature of this invention that the microwave transmissive bowl 12 have a substantial mass, preferably from about 1.5 to 3 pounds whereby a reliable sealing engagement between the rim 38 and the perimeter sealing ring 24 can be established, sufficient to permit development of superatmospheric pressure in the chamber 40. The sealing engagement may be developed between the rim 38 of the bowl 12 and the surface of the metal grilling plate 20. The microwave transmissive bowl 12 preferably is transparent to light. The microwave transmissive bowl 12 can be formed from heat resistant glass or glass-ceramic to permit viewing of cooking food within the chamber 40. Alternatively the microwave transmissive bowl 12 can be fabricated from ceramic having one or more light transparent panels of heat resistant glass or the like to provide a view of the interior of chamber 40.

It will be observed in FIG. 5 that the handle members 30, 36 are relatively close together and aligned in the illustrated assembly to permit the cook to lift, shake, invert and/or carry the assembly of FIG. 5 as a unit.

The collector assembly 14, FIG. 3, includes a microwave transmissive pot 42 which is preferably light-transmissive, a metal pot 44 and a perforated metal pan 46. The microwave transmissive pot 42 has a base 48, tapering sidewalls 50, an upper rim 52 and an inset shoulder 54. Handle members 56 extend outwardly from the tapered sidewalls 50 and are adapted to mate with corresponding handle members 30, 36 of the heat generating member 10 (FIG. 8) or the microwave transmissive bowl 12 (FIG. 7), respectively. The microwave transmissive pot 42 is fabricated preferably from transparent heat-resistant glass, glass-ceramic or temperature resistant plastic. The metal pot 44 is analogous to a frying pan having a base 58, tapering sidewalls 60 and an outwardly extending upper rim flange 62 which rests upon the shoulder 54 of the microwave transmissive pot 42. A chamber 64 is formed between the microwave transmissive pot 42 and the metal pot 44. The perforated metal pan 46 has a perforated base 66 and tapering sidewalls 68 which permit engagement with the inner surface of the tapering sidewalls 60 of the metal pot 44. The metal pot 44 is preferably fabricated from aluminum or aluminum alloy and has a thickness of about 1.5 millimeters. The perforated pan 46 is preferably fabricated from aluminum or aluminum alloy and has a thickness of about 1.5 millimeters. The perforations of the perforated pan 46 must be small enough to block passage of microwave energy and large enough to permit free passage of steam and rendered by-product. The perforations are distributed over the base 66 in a preferred embodiment. Alternatively the perforations are provided solely in the perimeter region of the base 66, in which case, some by-products will remain in contact with food on the pan. The perforation area is about 6 to 65 sq. millimeter. The total area of all of the perforations is from about 10 to about 50% of the total area of the base 66. Circular perforations from about 0.5 to 10 millimeters diameter are preferred.

The optional pan element 16, FIG. 4, includes a base 70 and upstanding sidewalls 72, preferably outwardly tapered. The optional pan element 16 preferably is fabricated from aluminum or aluminum alloy. The optional pan element 16 functions to prevent spread of liquids and cooking juices from food products which are being heated in the present apparatus and also as a serving or eating dish. The base 70 of the optional pan element 16 preferably rests in direct heat exchange engagement with the exposed surface of the metal grilling plate 20 as shown clearly in FIGS. 9, 11. Optionally, the surface of the metal grilling plate 20 may be coated with a film of cooking oil or other liquid to improve the heat transfer between the metal grilling plate 20 and the optional pan element 16. A similar film of cooking oil, melted butter, or other fluid may be placed in the optional pan element 16 to cover the base 70 and improve the heat exchange from the auxiliary cooking pan 16 to its food contents.

Assembly of Elements

The elements of the present cooking assembly can be combined in a variety of novel and useful cooking utensils.

Figure 6:
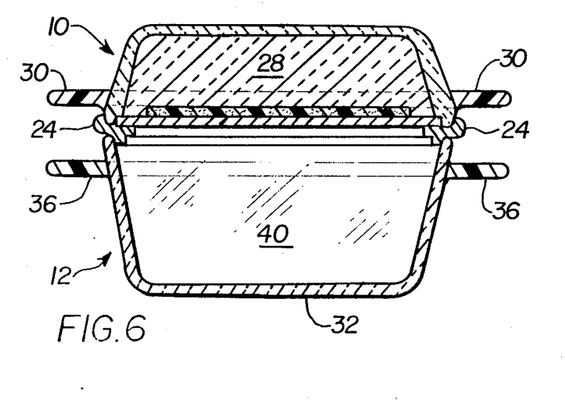
FIG. 6 is a cross-section illustration of an alternative, i.e., inverted, assembly of the first and second elements.

The microwave transmissive bowl 12 and the heat generating element 10 can be combined as shown in FIGS. 5, 6. In each of these examples, the rim 38 of the microwave transmissive bowl 12 engages the perimeter ring 24 on the metal grilling plate 20 to provide a steam confining chamber 40. When the microwave transmissive bowl 12 is fabricated from transparent material such as heat resistant glass and the temperature within the chamber 40 is above the steam condensation temperature, then the inner walls of the bowl member 12 will be free of condensed moisture and the contents cooking in chamber 40 will be visible through the transparent walls of the bowl member 12. This can be achieved: (1) in FIG. 5, the weight of the bowl member 12, preferably 1.5 to 3 pounds, urges engagement of the rim 38 and sealing member 24 or metal grilling plate 20 to provide a seal to confine the steam at slightly elevated pressures above atmospheric; and (2) in FIG. 6, the inverted combination of FIG. 5 can be employed in a variety of food heating sequences depending upon the nature of the food and the desires of the cook—the weight of the heat generating member 10, probably about 1.5 to 3 pounds, urges engagement to provide a seal to confine the steam at slightly elevated pressures above atmospheric.

Figure 7:
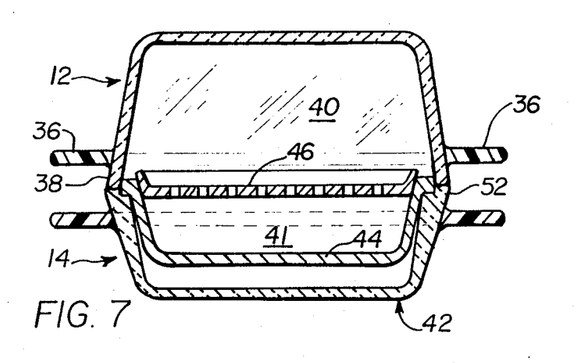
FIG. 7 is a cross-section illustration of an assembly of the second and third elements.
Figure 10:
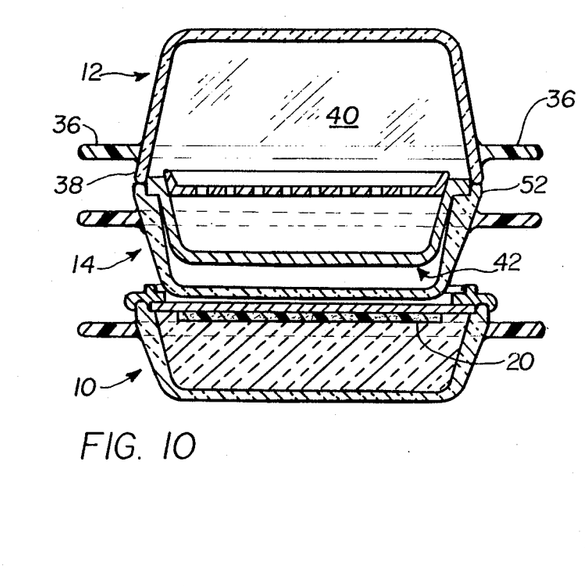
FIG. 10 is a cross-section illustration of an assembly of the first, second and third elements.

The microwave transmissive bowl 12 may be combined with the collector assembly 14 as shown in FIGS. 7, 10 wherein the rim 38 of the microwave transmissive bowl 12 engages the upper rim 52 of the microwave transmissive pot 42 to form a chamber 40'.

As shown in FIG. 10, three of the members are combined in an assembly including the microwave transmissive bowl 12, the collector assembly 14 and the heat generating member 10.

Figure 8:
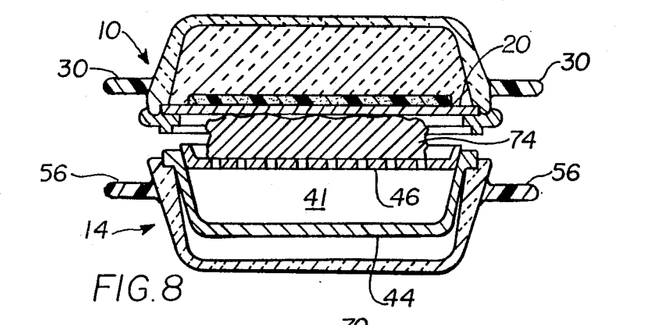
FIG. 8 is a cross-section illustration of an assembly of the first and third elements.

The heat generating member 10 can be combined with the collector member 14 as shown in FIG. 8 with a food item 74, such as a steak, resting upon the perforated plate 46 and supporting the metal grilling plate 20.

Figure 9:
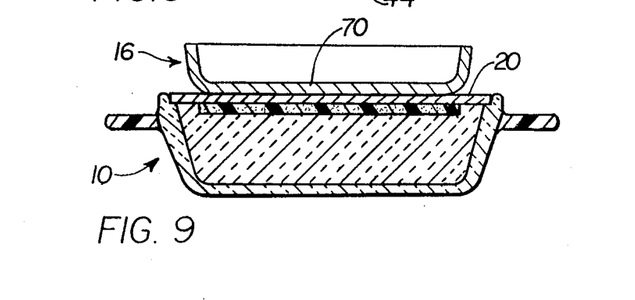
FIG. 9 is a cross-section illustration of an assembly of the first element and an optional pan element.
Figure 11:
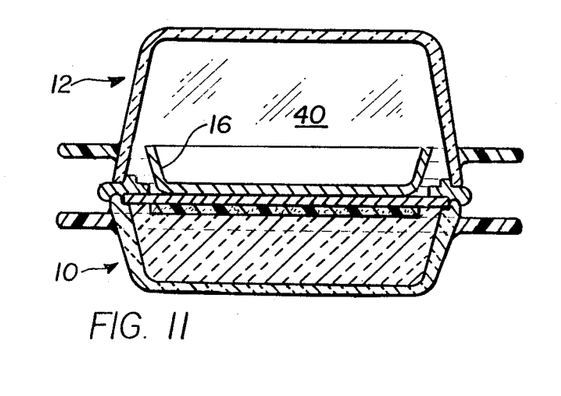
FIG. 11 is a cross-section illustration of an assembly of the first and second elements and an optional pan element.

The optional pan member 16 may be combined with the heat generating member 10 as shown in FIGS. 9, 11 wherein the flat base 70 of the optional pan member 16 rests upon the metal grilling plate 20 of the heat generating member 10. In FIG. 9, the optional pan member 16 functions as a frying pan, griddle plate, pizza-pie pan or cake pan. In FIG. 11, the optional pan member 16 is confined within a steam retaining chamber 40 and supports food items (not shown in FIG. 11) which are being cooked.

Figure 12:
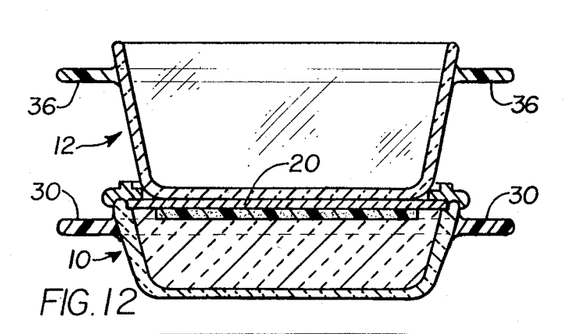
FIG. 12 is a cross-section illustration of an assembly of the first and second elements

FIG. 12 illustrates the heat generating member 10 and the microwave transmissive bowl 12 as an assembly in which the heat generating member 10 is being heated and the contents of the bowl 12 (e.g., soup, frozen food, et cetera) is being heated by microwave energy. The assembly of FIG. 12 suggests that two differing functions of the elements can be carried out concurrently in a microwave oven chamber.

Other useful combinations of the elements are hereinafter described as they are employed in various cooking operations.

I. A Frozen Two-crust Pie

A frozen two-crust pie has presented difficulties in microwave cooking because of several different heating requirements. The bottom crust and the top crust require high temperatures for baking the pastry and browning it to an aesthetically pleasing appearance—without burning. The interior of the frozen pie is largely water (e.g., apple pie, cherry pie, meat pie, etc.) which requires thawing and subsequent heating to complete its cooking cycle.

Figure 13:
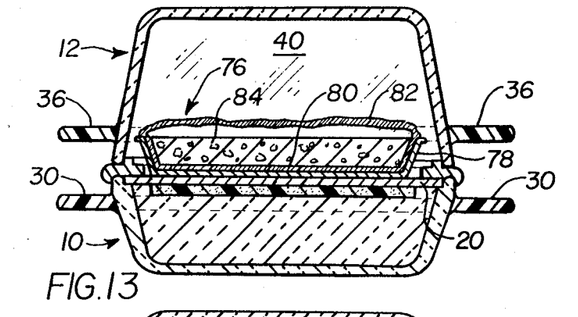
FIG. 13 is a cross-section illustration of an assembly of the first and second elements, similar to FIG. 5 including a cross-section view of a two-crust pie and pie pan.

The assembly of elements shown in FIG. 5 has been reproduced in FIG. 13 to illustrate double-crust pie cooking with the present kit.

A frozen two-crust pie, typically a fruit pie, can be baked successfully by initially heating the assembly of FIG. 5. The metal grilling plate 20 is at temperatures of the order of 350–500 degrees F., i.e., sufficient to bake a pie crust. The pre-heated assembled unit consisting of the bowl member 12 and the heat generating member 10 is removed from the microwave oven by means of the juxtaposed handles 30, 36. A frozen fruit pie 76 is introduced, FIG. 13, into the chamber 40 in its metal pie plate 78 which is placed directly upon the metal grilling plate 20. The bowl member 12 is replaced and the assembly as shown in FIG. 13 is returned to the microwave oven and exposed to microwave energy. The very high temperature of the metal grilling plate 20 is transmitted directly through the metal pie plate 78 into the frozen pie 76 causing defrosting and actual baking of a bottom pie crust 80. Microwave energy enters through the top pie crust 82 and causes baking of the top pie crust 82 and also causes defrosting and heating of the pie filling 84. The pie filling 84 is also heated conductively by heat rising upwardly from the metal grilling plate 20 through the metal pie plate 78 and the bottom crust 80. If the upper pie crust 80 is imperforate, it is easier for the crust 80 to rise upwardly and bake uniformly in a dome shape.

In operation, the cook considers the weight of the heat generating member 10 and chooses the amount of time to preheat the heat generating member 10 so that, when the pie 76 contacts the preheated metal grilling plate 20, a suitable amount of stored heat will be available for delivery to the bottom crust 80. For some foods such as a 26 oz. frozen fruit pie, preheating of the heat generating member 10 to store heat may not be necessary. While the pie defrosts, its filling heats and its top crust browns, the heat generating member has adequate time to heat and brown the bottom crust. A small 8 oz. meat pie with a liquid filling may require more preheating and/or standing time on hot metal grilling plate 20.

In all cases, the pie is confined within the chamber 40 while in the baking process.

The assembly of FIG. 13 also can be employed to bake freshly prepared two-crust pies, i.e., pies which have not been frozen.

The apparatus of FIG. 13 also may be employed to cook one-crust pies (top crust) such as meat pies by placing the frozen one-crust pie on its metal pie plate into the chamber 40 and placing the assembly in a microwave oven for exposure to microwave energy.

II. Pizza Pies

Figure 14:
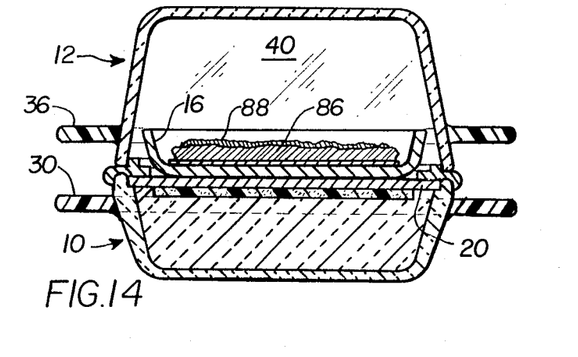
FIG. 14 is a cross-section illustration of an assembly of the first, second and fourth elements including a cross-section of a pizza pie.
Figure 15:
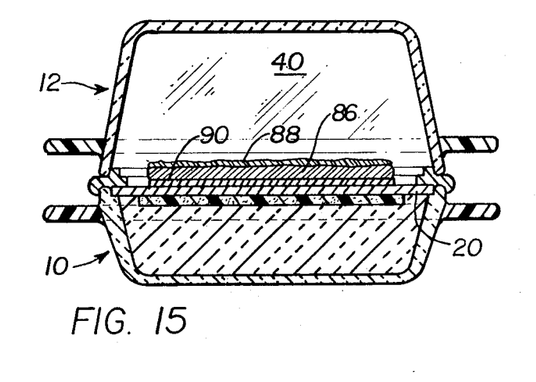
FIG. 15 is a cross-section illustration of an assembly of the first and second elements similar to FIG. 5 including a cross-section view of a pizza pie.

The assembly of FIG. 11, reproduced in FIG. 14, may be employed to prepare a frozen pizza pie wherein the optional pan element 16 is placed on the metal grilling plate 20 and a frozen pizza pie 86 is placed on the auxiliary pan element 16. The assembly of FIG. 11 is preheated without the pizza pie to a suitable elevated temperature, preferably from about 350–500 degrees F. before introducing the pizza pie 86 to optional pan 16. The optional pan element 16 is in a heat transfer relationship with the metal grilling plate 20 whereby the bottom crust of the pizza pie 86 becomes rapidly heated and crusted by direct conduction of heat energy. Microwave energy applied directly through the microwave transmissive bowl member 12 heats the topping 88 of the pizza pie 86 and causes moisture from the pizza pie to form steam within the steam confining chamber 40. The steam is at a slight superatmospheric pressure determined by the weight of the bowl member 12. If the frozen pizza pie 86 has its own aluminum foil pan 90, the optional pan element 16 is not required and the assembly may be used as illustrated in FIG. 15. The pizza pie 84 may be applied directly to the metal grilling plate 20, on its aluminum foil pan 90. In order to achieve uniform heating of a pizza pie, it may be desirable to apply several drops of cooking oil to the top of the metal grilling plate 20 to achieve more uniform thermal contact between the metal grilling plate 20 and the optional pan element 16 (FIG. 14) or the aluminum foil pan 90 (FIG. 15).

In FIG. 11, a perforated pan 46 may be used in place of the pan 16 on the metal grilling plate 20. The perforations on pan 46 do not hinder the crusting and browning of a pizza pie crust.

III. Soft Cooking and Frying Eggs

The combination of the optional pan member 16 and the heat generating member 10 is illustrated in FIG. 9 wherein the optional pan element 16 functions as a griddle or frying pan. The combination of the two members of FIG. 9 is placed into a microwave oven and heated until an appropriate temperature is achieved. The unit is then removed from the oven and, in its heated condition can be employed for frying eggs outside the microwave oven. The metal grilling plate 20 may be concave for this embodiment to direct the egg toward the center of the plate.

It is known that fresh eggs are sensitive to microwave oven cooking and, if heated in a microwave oven, are frequently cooked unevenly with some parts firm and other parts essentially raw. The unevenness can be offset in part by providing rotating tables or by frequently opening the microwave oven and manually moving the cooking egg to different locations within the microwave oven chamber. However when eggs are cooked according to the present invention, the heated optional pan member 16 in combination with the heat generating member 10 retains appropriate heat to complete cooking of a raw egg to the desired degree of firmness outside the microwave oven.

In operation, when heat generating member 10, bowl member 12 and pan 16, as shown in FIG. 11, are preheated, the preheated aluminum pan 16 can become a frying pan to fry an egg therein. If the heat generating member 10 is heated to a suitable temperature and sufficient heat is stored in the assembly, the shelled egg is applied to the heated pan 16 and the cooking egg is not exposed to microwave energy which could "hard boil" the egg yolk.

When heat generating member 10 and bowl member 12, as shown in FIG. 5, are preheated for a predetermined time, the assembly is available to soft cook (e.g. coddle) an egg placed on the metal grilling plate 20 or in a metal pan 16 (FIG. 9). Note that (1) the time required to preheat the metal grilling plate 20 in order to soft cook an egg is a fraction of the time required to fry an egg; (2) the aluminum pan 16 is not preheated empty; and (3) no oil is used to make good thermal contact. The egg is slowly soft cooked to individual taste, i.e., about five minutes, solely from the heat energy stored in the heat generating member 10.

Other foods which may be fried or grilled can be placed on the heated combination of the heat generating member 10 and the optional pan member 16 as shown in FIG. 9 and in FIG. 11. The assembly of FIG. 11 is preferred because (1) the heat collected in the chamber 40 is not lost; (2) any splatter is contained; and (3) the food is shielded from the cooling action of circulating air which is present in most microwave oven chambers; and (4) the bowl member 12 increases in microwave lossiness as it heats.

IV. Cake Baking

Baking cakes in microwave ovens in the past has been difficult because of the unevenness of the heat application. Cakes tend to rise unevenly and to provide irregular top surfaces which are undesirable.

Figures 16, 17:
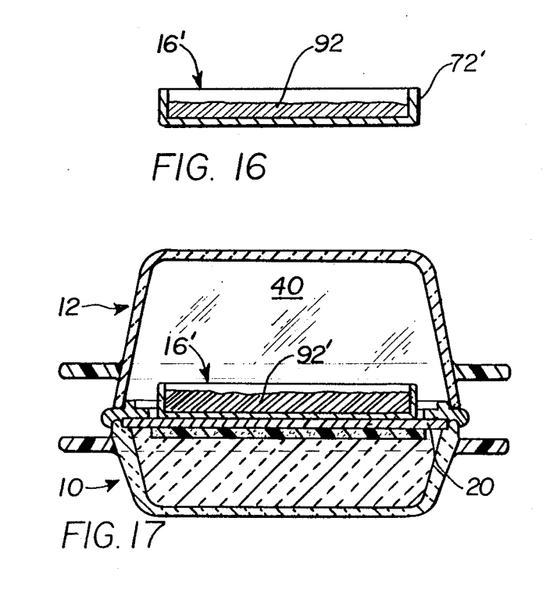
FIG. 16 is a cross-section illustration of an alternative construction of the fourth element for cake baking.
FIG. 17 is a cross-section illustration of an assembly of the first, second and fourth elements wherein the fourth element corresponds to that illustrated in FIG. 16.
Figure 18:
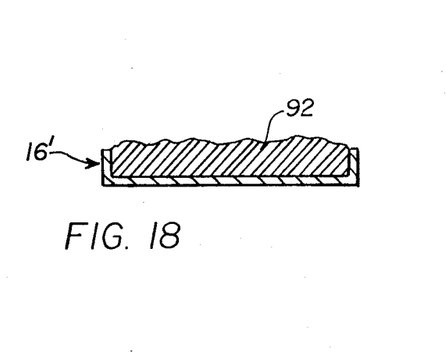
FIG. 18 is a cross-section illustration of the fourth element similar to that of FIG. 16 containing a baked cake.
Figure 19:
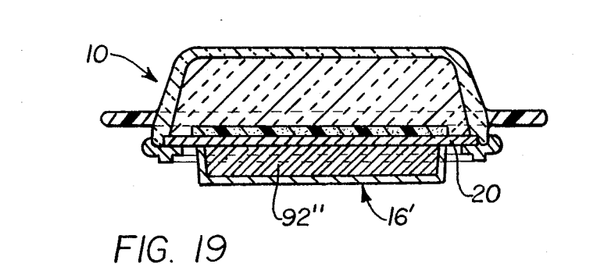
FIG. 19 is a cross-section illustration of an assembly of the first and fourth elements with a baked cake in the fourth element.
Figure 20:
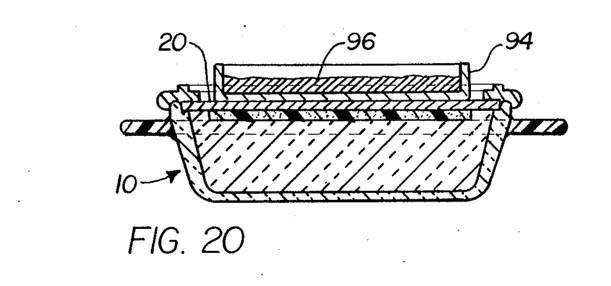
FIG. 20 is a cross-section of the first and fourth elements with a frozen food illustrated in cross-section on the fourth element.

According to the present invention, a cake batter 92 is mixed and introduced into a lightly greased optional pan member 16', preferably having generally vertical or slightly sloping sidewalls 72', corresponding to a conventional cake tin shown in FIG. 16. The quantity of cake batter 92 should be sufficient so that the baked cake will rise slightly above the level of the sidewalls 72'. The combination of a heat generating member 10 and a bowl member 12 as in FIG. 5, is preheated in a microwave oven before removing it to place the cake batter 92 and the optional pan member 16' therein. The combination of heated heat generating member 10, pan member 16' with cake batter 92 and the microwave transmissive bowl 12 shown in FIG. 17, is returned to the microwave oven wherein the cake is baked as a result of (1) exposure to the microwave energy in the microwave oven and (2) by conductive heat from the heat generating member 10; and (3) by the superatmospheric steam in the chamber 40. After the cake has raised above the level of the rim of the optional pan member 16' and completed its baking, the top surface of the cake 92, FIG. 18, will be irregular and neither crusted nor browned. The assembly of FIG. 17 is removed from the microwave oven and disassembled. The heated heat generating member 10 is turned over on top of the cake as shown in FIG. 19. The cake 92" will be flattened to a uniform top surface by direct contact with the heated metal grill plate 20 which will also brown and crust the top surface of the cake.

The weight of the heat generating member 10 will not crush the cake 92' but will provide a flat top for the cake coplanar with the upper rim of the optional pan member 16'.

Additional browning and crusting is possible by exposing heat generating member 10 resting on top of pan member 16' for an additional period of time to microwave energy. During this additional browning and crusting, microwave energy cannot reach the baked cake because it is shielded on its top by metal grilling plate 20 and on its sides and bottom by pan member 16'.

V. Defrosting and Heating TV Dinners

A frozen food, conventionally packaged on an aluminum foil tray or high temperature resistant plastic tray or other heat-resistant support, is placed in an assembly of the type shown in FIG. 5, i.e., a heat generating member 10 and a microwave transmissive bowl 12. The frozen food 96 can be quickly and conveniently heated. When heating a frozen food, for example, a TV dinner in the non-preheated assembly of FIG. 21, the microwave transmissive bowl 12 may become coated with condensed moisture on its inner surface. The condensed moisture will fall down on to the surface of the metal grilling plate 20 of the heat generator member 10, forming steam which increases the overall heat content of the assembly. At some stage, the assembly chamber 40 is heated above the dew point of its steam contents and instantly the condensation on the inner surface of the microwave transmissive bowl 12 disappears. Thereafter the cook can visually observe the food and determine when the food has properly heated. The experienced cook will recognize and take into account that some after-cooking of the frozen food may occur.

Figures 21, 22:
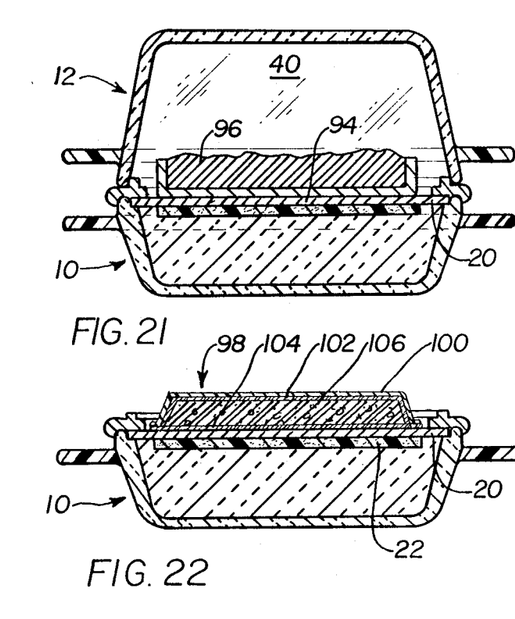
FIG. 21 is a cross-section illustration of an assembly of the first and second elements and fourth elements showing a frozen food, in its tray, contained on the first element.
FIG. 22 is a cross-section illustration of the first element with an inverted, two-crust pie and pie pan illustrated in cross-section.

The frozen food 96 is heated by a combination of conductive heat transferred from the metal grilling plate 20 into the frozen food container 94 and thence into the bottom portions of the frozen food 96. At the same time microwaves are entering into the chamber 40 through the microwave transmissive bowl 12 and penetrate into the frozen food 96 causing some volatilization of moisture and some heating of the frozen food 96. The amount of dehydration of the frozen food 96 is controlled because the volatilized steam is confined at slightly superatmospheric pressures within the chamber 40. It may be desirable to spray selective areas of the upper surface of the frozen food 96 with moisture prior to defrosting and heating in order to reduce the hydration tendencies of peas and carrots, for example, relative to the meat portions. Adding moisture is more fully described in U.S. Pat. No. 4,390,555 supra.

VI. Alternative Technique for Baking Pies

Figure 23:
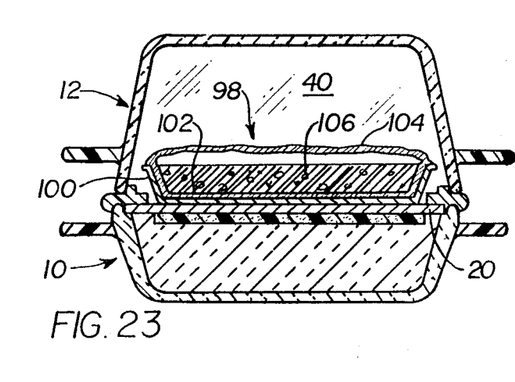
FIG. 23 is a cross-section illustration of the first, second and fourth elements wherein the fourth element is a pie pan and the pie pan contains a two-crust pie, shown in cross-section.

An alternative technique for baking pies can be described in connection with FIGS. 22 and 13. A frozen meat pie or other moist ingredient pie having a bottom crust which is difficult to bake satisfactorily, can be baked in a novel manner with selected members of the kit of this invention. As shown in FIG. 22, a frozen pie 98 is provided on an aluminum foil pie pan 100 and includes a bottom crust 102, a top crust 104 and a moisture containing filling 106. It will be observed that the top crust 104 extends beyond the marginal flanges of the pie pan 100. The frozen pie 98 is placed upside down with its top crust 104 against the metal grilling surface 20 of the generating member 10 and covered by the microwave transmissive bowl member 12. The assembly as shown in FIG. 22 is placed in a microwave oven and exposed to microwave energy. The microwaves cannot penetrate the metal pie pan 100 and accordingly function to create heat at the microwave absorbent substance 22 which is transmitted to the metal grilling plate 20 and thence directly to the top pie crust 104 until the top pie crust 104 thaws and partially bakes to a suitable brown coloring. Thereafter the assembly of FIG. 22 is removed from the microwave oven. The frozen pie 98 has its top crust 104 partially prebaked and its bottom crust 102 defrosted and heated from the steam evolved during the prebaking of top crust 104. This partially prebaked pie is placed in its normal position and the assembly is covered with a microwave transmissive bowl 12 to produce the assembly of FIG. 23. The aqueous pie filling 106 remains frozen throughout the prebaking of the top crust 104. Thus the pie 98 remains essentially frozen and can be easily inverted. The heated assembly of FIG. 23 is returned to the microwave oven and baking of the pie is completed. During the final stage of baking, the bottom crust 102 is heated primarily by conduction of heat energy from the metal grilling plate 20 through the pie pan 100. The aqueous pie filling 106 is heated primarily by microwave energy which penetrates the microwave transmissive bowl 12 and penetrates the top crust 104. The pre-browned top crust 104, now free to rise, will rise, crust and turn brown. The chamber 40 becomes filled with superatmospheric steam, which combines with the hot temperatures which continue to develop on the metal grill surface 20 to complete the heating and baking of the side and bottom crust 102.

Typically, in the operation described in connection with FIG. 22, the preferred defrosting and partial prebrowning of the top surface of the pie occurs approximately two minutes after the time normally required for the temperature of metal grilling plate 20 to rise to a temperature of about 350 degrees F. For example, if the metal grilling plate 20 required seven minutes to rise to 350 degrees F., then in contact with the frozen pie crust, the metal grilling plate 20 will heat in about nine minutes.

VII. Popcorn

Figure 24:
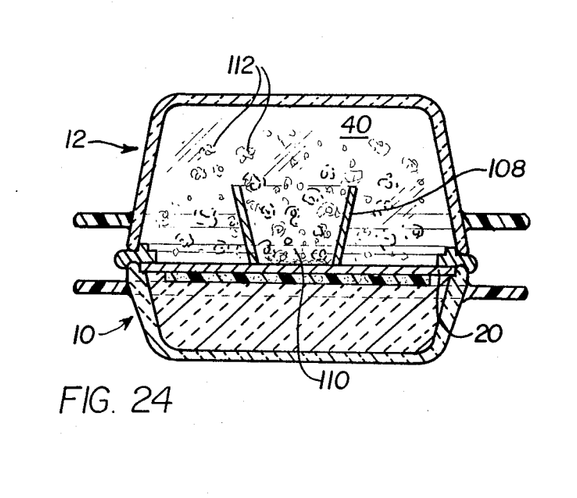
FIG. 24 is a cross-section illustration of an assembly of the first and second elements including a conical frustum sleeve for heating popcorn.

A number of processes for baking popcorn in microwave ovens are described in the literature. U.S. Pat. Nos. 3,973,045; 4,292,332; 4,435,628; 4,450,180. The kit of the present invention provides an improved popcorn making facility as shown in FIG. 24. The assembly of FIG. 12 is provided with a frustoconical sleeve 108 which is placed with its narrow opening on the metal grilling plate 20. The sleeve 108 restricts unpopped corn to the central region of the metal grilling plate 20 which is the hottest region. A supply 110 of unpopped popcorn is placed in the bottom of the frustoconical sleeve 108. The microwave transmissive bowl 12 is placed on the heat generating member 10 and the assembly of FIG. 24 is placed in the microwave oven. Heating the supply 110 of unpopped popcorn causes popping to occur to produce popped popcorn 112 which rises up in the frustoconical sleeve 108 and overflows onto the cooler heated surface of the metal grilling plate 20. After the popping is completed, the assembly of FIG. 24 is removed from the microwave oven and is inverted. The microwave transmissive bowl 12 thereafter functions as a warm serving dish for the popped popcorn 112. The frustoconical sleeve 108 is removed from the bowl 12 after it is inverted to its open top position. Preferably the frustoconical sleeve 108 is formed from heat resistant glass.

VIII. Steam Cooking

Referring to FIG. 7, the present kit may be assembled to produce a steamer type cooking utensil wherein a supply of water is introduced into the chamber 41 beneath the perforated plate 46 and the metal pot 44. The metal pot 44 may be dispensed with or the metal pot 44 may be inverted over the perforated plate 46. The water vaporizes and the resulting steam is contained within the chambers 40, 41. Any food positioned on top of the perforated pan 46 will be steamed and thereby cooked in the manner of a steam cooker. This technique is useful for seafoods (lobsters, shrimp, etc.), desserts (plum puddings, fig puddings, etc.), steam heating bakery goods (rolls, buns, etc.).

When a perforated pan 46 is employed as a shelf within the chamber 40, a food can be exposed to microwave energy on a perforated pan 46 or directly in the microwave transmissive pot 42. When a perforated pan 46 is used as a shelf, water can be boiled beneath perforated pan 46, and the steam from the boiling water will be contained within the cavity 40, to steam cook contained food.

To steam foods, for example, to cook frozen lobster tails, the cook can first dip the frozen lobster tails in water before heating in the bowl member 12, in the assembly shown in FIG. 6. Alternatively some water could be first boiled in the bowl member 12; thereafter the frozen lobster tails are placed in the boiling water and covered by heated, heat generating member 10. The food is then exposed to superatmospheric steam, i.e., steam heated by the metal grilling plate 20 and by microwave energy.

Another example of steaming is cooking a frankfurter (hot dog) in the assembly of FIG. 6. The frankfurter is placed in the bowl member 12 and heated by microwave energy and superatmospheric steam. Steam which contacts the metal grilling plate 20, becomes super heated. The steam results from frankfurter juices or from moisture added to the chamber by the operator. When the frankfurter is heated, the assembly of FIG. 6 is inverted to create the assembly of FIG. 5. The frankfurter falls onto the hot metal grilling plate 20 and is grilled to the desired degree of browning.

Frankfurter rolls also may be placed in the bowl member 12 with the frankfurter for heating in the FIG. 6 assembly. When the elements are inverted, the frankfurter rolls are toasted on the metal grilling plate 20 while the frankfurters are being grilled.

IX. Frozen Fried Foods

A novel process for heating and cooking frozen prefried foods such as fried potatoes, fried chicken employs the heat generating member 10 and bowl member 12 assembled as shown in FIG. 6. The assembly is preheated to an operating temperature (about 500 degrees F.) by exposure to microwaves in a microwave oven. The assembly is removed and a frozen fried food is placed into the cavity 40 on the bowl base 32. The preheated assembly is returned to the microwave oven and exposed to microwave energy until the food defrosts and heats to a temperature approaching a desired serving temperature. Thereupon the heat generating member 10 and the bowl member 12 are inverted to a position shown in FIG. 5 so that the warm, fried food falls by gravity onto the metal grilling plate 20 where the food bakes, browns, crusts, fries and/or sears as the case may be in surface contact with the hot metal grilling plate 20. While in either the FIG. 5 or the FIG. 6 configuration, the food can be stirred conveniently by removing the assembly from the microwave oven and firmly holding handles 30, 36 together and shaking the assembly to agitate its food contents When cooking is completed, the bowl member 12 may be placed on top of the heat generating member 10 as shown in FIG. 12 to keep the food warm during serving.

Deep fat frying can be simulated by applying a small quantity of cooking oil to the frozen food to replace some of the oil which may be driven off during the defrosting and heating. When the heated food drops onto the heated metal grilling plate 20 at the moment of inversion of the assembly, there is no significant loss of temperature on the metal grilling plate 20.

X. Steak Broiling

In FIG. 8, a steak 74 is shown supported on a perforated aluminum pan 46 over a microwave-shielded by-product condensation chamber 41 defined by the metal pot 44 and the perforated cake pan 46. The steak 74 contacts and supports the heat generating member 10. The weight of the heat generating member 10 urges the metal grilling plate 20 into engagement with the top of the steak 74. The heated metal grilling plate 20 heats and grills the top surface of the steak 74. Liquid by-products of the cooking process fall by gravity into the by-product collection chamber 41 whence they may be recovered for use as gravy. Microwave energy may enter into the steak 74 directly through the sides of the steak to heat and cook the meat. Preferably the steak 74 is used without a bone which might interfere with the required surface contact of the metal grilling plate 20 with the upper surface of the steak. Note that the microwave-shielded by-product condensation chamber 41 is surrounded by metal which precludes entry of microwaves and avoids heating of the juices by microwave energy. Other meats and foods such as sausages and hamburgers can be grilled in the same manner as the steak.

XI. Sausage Cooking

Referring to FIG. 10, there is a bowl member 12 on top of a collector assembly 14. This configuration is useful for rapid defrosting and heating food such as sausages which yield large quantities of liquid by-products during cooking. Where the microwave transmissive pot 42 of FIG. 10 is fabricated from glass, ceramic, it can rest directly on the metal grilling plate 20 whereby the heating member 10 is preheated while the by-product producing food is being precooked. After the product such as sausages is adequately precooked, the collector assembly 14 is removed and the assembly of FIG. 5 is reconstituted to permit the searing and final grilling of the sausage on the heated metal grilling plate 20. The preheated sausage, for example, may be final-cooked on the metal grilling plate 20 simultaneously with frying an egg on the metal grilling plate 20. Both operations preferably are conducted in the absence of microwave energy—i.e., outside the microwave oven.

XII. Biscuit Baking

Figure 25:
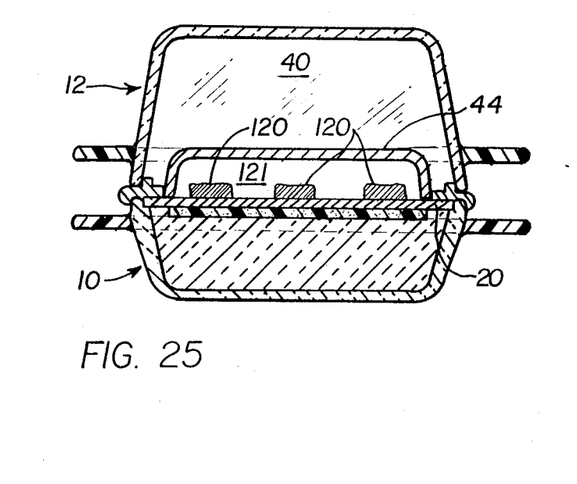
FIG. 25 is a cross-section illustration of an assembly of the first, second and fourth elements to provide a baking chamber for biscuits, breads, rolls, etc.

Biscuits may be baked with the assembly illustrated in FIG. 25 including a heat generating member 10, a microwave transmissive bowl 12 and an inverted metal pot 44. The metal pot 44 and the metal grilling plate 20 combine to define a baking chamber 121. Individual biscuits 120 are placed in the baking chamber 121 and are protected from exposure to microwaves because of their complete metal enclosure consisting of the inverted metal pot 44 and the metal grilling plate 20. The metal grilling plate 20 may be at room temperature when the biscuit baking commences or may be preheated. Thus the biscuits 120 are conductively heated from the heated metal grilling plate 20 and rise upwardly. After the biscuits have risen and the bottom surfaces become brown, the assembly may be removed from the microwave oven and the biscuits 120 may be inverted on the heated metal grilling plate 20 and the assembly of FIG. 25 reconstructed and returned to the microwave oven to complete browning of the other surface of the biscuits. The presence of the microwave transmissive bowl member 12 prevents any significant heat loss from the system and provides a superatmospheric pressure during the baking operation.

Nesting

Figure 26:
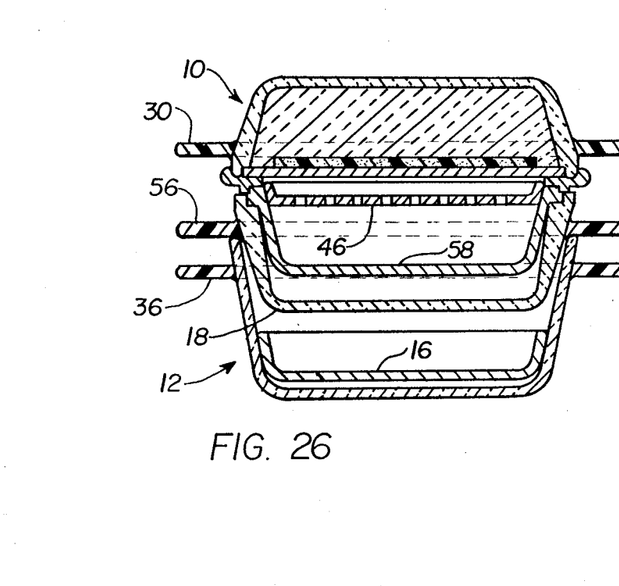
FIG. 26 is a cross-section illustration of a nested kit of elements for shipping or storage.

In a preferred embodiment, all of the elements of the present cooking kit, namely, the heat generating member 10, the light transmissive bowl member 12, the collector assembly 14 and the optional pan element 16 should be nestable for shipping and storage purposes. A typical nested kit is shown in FIG. 26. Preferably all of the elements in their nested condition should fit into a microwave oven for storage therein when not in use. Nesting requires appropriate design of the slopes of the side walls of the various elements and appropriate selections of depths and widths. It may be desirable to provide more than one metal pot 44, for example, to develop a larger baking chamber 121.

General Comments

It is preferable that the cross-section shape of the elements of the present kit are circular. However other cross-sections are certainly feasible and in come cases even desirable, for example, generally square, preferably with rounded corners; rectangular, preferably with rounded corners; oval; and other shapes corresponding to the shape of the anticipated food article or container.

I claim:

1. The method of baking a frozen two-crust pie having a wide top crust and a narrow bottom crust in a microwave oven which comprises:
    placing the frozen two-crust pie in a metal pie pan on a metal surface with the said wide crust resting on said metal surface; enclosing said pie in a chamber having a superatmospheric pressure and exposing said pie, said metal surface and a microwave absorptive substance engaged with said metal surface to microwave energy, whereby the said metal surface is heated by conduction from said microwave absorptive substance; thereafter, when the top crust is suitably pre-baked, removing the pie from the said chamber and inverting the pie in the said metal pie pan to its normal orientation with its pie pan on the bottom and its pre-baked wide crust on top; thereafter placing the said pie pan on the said heated metal surface in heat transfer engagement, and restoring the pie to said chamber having superatmospheric pressure and thereafter exposing the said pie, the said heated metal plate and the said microwave absorptive substance to microwave energy until the pie baking is completed.

2. The method of baking a cake in a microwave oven which comprises introducing into a metal cake pan a sufficient quantity of cake batter so that the baked cake will rise slightly above the side wall of the said cake pan; placing the cake pan containing the said cake batter on a metal grilling plate having on a surface a coating of microwave absorptive substance; enclosing said cake pan containing the said cake batter in a chamber having a superatmospheric pressure; exposing the said metal plate and the said microwave absorptive substance to microwave energy until the said cake is fully baked and risen, at least in part, above the top rim of the said cake pan; thereafter removing the cake and cake pan from the said chamber and inverting the said heated metal plate on top of the said cake until the cake has developed a flattened, browned top surface; thereafter recovering a baked cake having an upper surface which corresponds with the surface of the said heated metal plate.

3. In the method of baking a cake in a microwave oven, according to claim 2, the added step of:
    returning the cake pan and heated metal plate thereon to the said microwave oven and exposing the said heated metal plate and said microwave absorptive substance to microwave energy to effect added browning and crusting of the cake.

4. A method for cooking a food in a microwave oven, comprising:
    forming an assembly of a heat generating member and a mating microwave transmissive bowl member, said heat generating member including a heat-conductive, metal grilling plate having in contact with its surface a microwave-absorptive, heating material; said microwave-transmissive bowl member having a rim engaged with said heat generating member; a stem-confining chamber defined by said heat generating member and said bowl member; placing said food in said chamber and exposing said assembly containing said food to microwave energy to heat said food in part by microwave energy directly and in part from heat from said heat generating member and in part from superatmospheric steam in said chamber;
    initially heating said food in the said bowl member with its said rim uppermost and thereafter completing the cooking of heated food by inverting the said assembly whereby the said food contacts the said metal grilling plate and finishes cooking thereon.

5. A method for cooking a food in a microwave oven, comprising:

forming an assembly of a heat generating member and a mating microwave transmissive bowl member, said heat generating member including a heat-conductive, metal grilling plate having in contact with its surface a microwave-absorptive, heating material; said microwave-transmissive bowl member having a rim engaged with said heat generating member; a steam-confining chamber defined by said heat generating member and said bowl member; placing said food in said chamber and exposing said assembly containing said food to microwave energy to heat said food in part by microwave energy directly and in part from heat from said heat generating member; and initially heating said food in said assembly with the rim of said bowl uppermost and thereafter completing the cooking of heated food by inverting said assembly so that the heated food falls onto said heat generating member and completing the cooking while said food is on said metal grilling plate.

6. The method of baking a cake in a microwave oven which comprises: introducing into a metal cake pan a sufficient quantity of cake batter so that the baked cake will rise slightly above the side wall of the cake pan; placing the cake pan containing the said cake batter on a microwave absorptive heating member; exposing said cake pan containing the said cake batter in a chamber having a superatmospheric pressure; exposing the said microwave absorptive heating member to microwave energy until the said cake is fully baked and risen, at least in part, above the top rim of the said cake pan; thereafter inverting the said microwave absorptive heating member on top of the said cake until the cake has developed a flattened top surface; thereafter recovering a baked cake having an upper surface which corresponds with the surface of the said microwave absorptive heating member.

7. In a method of baking a cake, in a microwave oven, according to claim 6, the added step of:
exposing the cake pan and the microwave absorptive heating member thereon to microwave energy to effect added browning of the cake.

8. The method of baking popcorn which comprises placing, in a microwave oven, a microwave absorptive heating member having a surface adapted to heat a food in contact therewith; a flared sleeve having its narrow bottom rim engaged with said heating surface; a microwave transmissive bowl having its bottom rim engaged with said microwave absorptive heating member to provide a steam-confining chamber in which said sleeve is positioned; placing a supply of uncooked popcorn in the said sleeve and applying microwave energy to the assembly until the said popcorn pops and rises upwardly and outwardly from said sleeve; and which includes inverting the said microwave transmissive bowl and said microwave absorptive heating member, after the said popcorn has been baked, removing said microwave absorptive heating member and subsequently using the said microwave transmissive bowl as a serving bowl for the baked popcorn.

9. A method of cooking a food in a microwave oven, comprising:
placing a microwave absorptive heating member having a surface which can be heated by exposure to microwave energy and which will transfer heat energy to a food in contact with said surface, over and engaged with a mating microwave transmissive bowl member; said microwave transmissive bowl member having its rim below and engaged with said microwave absorptive heating member; a steam confining chamber defined by said microwave absorptive heating member and said microwave transmissive bowl member; placing said food in said steam-confining chamber and exposing said microwave absorptive heating member and said steam-confining chamber, containing said food, to microwave energy, to heat said food from direct exposure to said microwave energy, from heat from said microwave absorptive heating member and from heat from superatmospheric steam in said chamber; initially heating said food, in said microwave transmissive bowl member, with its rim uppermost and thereafter inverting said assembly so that said food falls by gravity onto said surface where the cooking of heated food is completed.

10. A method of cooking a food, in a microwave oven, comprising:
forming an assembly of a microwave absorptive heating member and a mating microwave transmissive bowl member, said microwave transmissive bowl member having a rim engaged with said microwave absorptive heating member, a steam confining chamber defined by said microwave absorptive heating member and said microwave transmissive bowl member; placing said food in said chamber and exposing said assembly, containing said food, to microwave energy to heat said food in part by microwave energy and in part from heat from said microwave absorptive heating member; and initially heating said food, in said assembly, with the rim of said bowl uppermost and thereafter completing the cooking of heated food by inverting said assembly so the heated food falls by gravity onto said microwave absorptive heating member and completing the cooking while said food is on said microwave absorptive heating member.

11. A method of baking dough in a microwave oven, comprising:
introducing into a metal baking pan having side walls a sufficient quantity of dough so that said dough will rise above said side walls of said baking pan; placing said baking pan, containing said dough, on microwave-absorptive heating member in heat-transmitting relationship with said heating member; exposing said heating member and said pan containing said dough, in said pan, to microwave energy until the said dough is risen and baked, and is, at least in part, above said side walls of said baking pan; inverting said heating member; placing said heating member on top of said dough until the dough has developed a flattened top surface; and, thereafter, recovering said risen and baked dough having an upper surface which corresponds with the heating surface of said heating member.

12. In the method of baking dough in a microwave oven, according to claim 11, the added step of:
exposing said risen and baked dough, in said baking pan, with said microwave-absorptive heating member thereon, to microwave energy to develop added browning of said baked dough.

13. In the method of baking dough in a microwave oven, according to claim 11, the added step of:
preheating said microwave-absorptive heating member before placing said baking pan thereon.

14. In the method of baking dough in a microwave oven, according to claim 11, the added step of:

enclosing said baking pan containing said dough in a superatmospheric chamber within said microwave oven.

15. A method of cooking food, in a microwave oven, comprising:
forming an assembly of a microwave-absorptive heating member and a mating microwave-transmissive container, said microwave-transmissive container engaged with said microwave-absorptive heating member, a steam-confining chamber defined by said microwave-absorptive heating member and said microwave-transmissive container, placing said food in said chamber and exposing said assembly, containing said food, to microwave energy to heat said food in part by microwave energy and in part from heat from said microwave-absorptive heating member; and, initially, heating said food, in said assembly, with said microwave-absorptive heating member uppermost and thereafter inverting said assembly to complete the cooking, of said food, on said microwave-absorptive heating member.

16. In a method of cooking food, in a microwave oven, according to claim 15 which includes:
positioning said food, in a metal container having an open top.

17. A method of cooking food, in a microwave oven, comprising:
forming an assembly of a microwave-absorptive heating member and a mating microwave-transmissive bowl member, said microwave-transmissive bowl member having a rim engaged with said microwave-absorptive heating member, a steam-confining chamber defined by said microwave-absorptive heating member and said microwave-transmissive bowl member; placing said food in said chamber and exposing said assembly, containing said food, to microwave energy to heat said food in part by microwave energy and in part from heat from said microwave-absorptive heating member; cooking said food in two stages and inverting the said heating member from its position in the first stage to its position in the second stage.

18. The method of baking, in a metal pie plate, a frozen two-crust pie, having a wide top crust and a narrow bottom crust, which comprises:
inverting the frozen two-crust pie, in its metal pie pan, onto a microwave absorptive heating member having a surface which can be heated by exposure to microwave energy and which will transfer heat energy to a food in contact with said surface so that said wide top crust rests on said microwave absorptive heating member and the bottom and side crusts of said pie are shielded from direct microwave exposure by said metal pie pan; enclosing said pie in a chamber having a superatmospheric pressure and exposing said pie and said microwave absorptive heating member to microwave energy; thereafter, when the top crust is suitably pre-baked, inverting the pie to its normal orientation on said microwave absorptive heating member with said pie pan on the bottom and said pre-baked wide crust on the top; thereafter exposing said pie, on said microwave absorptive heating member in said superatmospheric chamber, to microwave energy until the pie baking is completed.

* * * * *